(12) United States Patent
Chaffins et al.

(10) Patent No.: US 11,001,050 B2
(45) Date of Patent: May 11, 2021

(54) MATERIAL SETS

(71) Applicant: Hewlett-Packard Development Company, L.P., Houston, TX (US)

(72) Inventors: Sterling Chaffins, Corvallis, OR (US); Kevin P. DeKam, Corvallis, OR (US); Cassady S. Roop, Corvallis, OR (US); Bret McHuron-Guss, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 215 days.

(21) Appl. No.: 16/073,585

(22) PCT Filed: Apr. 20, 2016

(86) PCT No.: PCT/US2016/028466
§ 371 (c)(1),
(2) Date: Jul. 27, 2018

(87) PCT Pub. No.: WO2017/184133
PCT Pub. Date: Oct. 26, 2017

(65) Prior Publication Data
US 2019/0126541 A1    May 2, 2019

(51) Int. Cl.
*B33Y 80/00*        (2015.01)
(52) U.S. Cl.
CPC ....... *B33Y 80/00* (2014.12); *Y10T 428/24802* (2015.01)
(58) Field of Classification Search
CPC .......... B33Y 80/00; B33Y 70/10; B29C 64/20
USPC ..................................................... 428/195.1
See application file for complete search history.

(56) References Cited

U.S. PATENT DOCUMENTS

| | | | |
|---|---|---|---|
| 6,363,606 B1 | 4/2002 | Johnson et al. | |
| 2007/0238056 A1 | 10/2007 | Baumann et al. | |
| 2010/0140550 A1 | 6/2010 | Keller et al. | |
| 2010/0202001 A1* | 8/2010 | Miller | A61B 6/583 358/1.9 |
| 2011/0200527 A1* | 8/2011 | Xu | A61K 47/62 424/9.1 |
| 2013/0300101 A1 | 11/2013 | Wicker et al. | |
| 2015/0378353 A1 | 12/2015 | Williams et al. | |
| 2016/0354978 A1* | 12/2016 | Kalo | B29C 64/106 |
| 2017/0297109 A1* | 10/2017 | Gibson | B29C 64/153 |
| 2019/0126541 A1* | 5/2019 | Chaffins | B29C 64/165 |

FOREIGN PATENT DOCUMENTS

| | | |
|---|---|---|
| CN | 103366210 | 10/2013 |
| CN | 103756293 | 4/2014 |
| EP | 2001656 | 10/2014 |
| WO | WO-2015112959 | 7/2015 |

* cited by examiner

*Primary Examiner* — Betelhem Shewareged
(74) *Attorney, Agent, or Firm* — HPI Patent Department (57) ABSTRACT

The present disclosure is drawn to material sets for 3-dimensional printing, 3-dimensional printing systems, and 3-dimensional printed parts. A material set can include a thermoplastic polymer powder having an average particle size from 20 μm to 100 μm, an x-ray contrast ink including a jettable x-ray contrast agent, and a fusing ink. The fusing ink can include a fusing agent capable of absorbing electromagnetic radiation to produce heat.

11 Claims, 3 Drawing Sheets

MATERIAL SETS

BACKGROUND

Methods of 3-dimensional (3D) digital printing, a type of additive manufacturing, have continued to be developed over the last few decades. Various methods for 3D printing have been developed, including heat-assisted extrusion, selective laser sintering, photolithography, as well as others. In selective laser sintering, for example, a powder bed is exposed to point heat from a laser to melt the powder wherever the object is to be formed. This allows for manufacturing complex parts that can be difficult to manufacture using traditional methods. In general, 3D printing technology improves the product development cycle by allowing rapid creation of prototype models for reviewing and testing. Both prototype and production parts created using 3D printing processes may require marking with quality control tracking information, serial numbers, and/or trademarks.

The figures depict several examples of the presently disclosed technology. However, it should be understood that the present disclosures is not limited to the examples depicted.

DETAILED DESCRIPTION

The present disclosure is drawn to the area of 3-dimensional printing. More specifically, the present disclosure provides material sets and systems for printing 3-dimensional parts with x-ray contrast features. In an exemplary printing process, a thin layer of polymer powder can be spread on a bed to form a powder bed. A printing head, such as an inkjet print head, can then be used to print a fusing ink over portions of the powder bed corresponding to a thin layer of the three dimensional object to be formed. Then the bed may then be exposed to a light source, e.g., typically the entire bed. The fusing ink absorbs more energy from the light than the unprinted powder. The absorbed light energy can be converted to thermal energy, causing the printed portions of the powder to melt and coalesce. This forms a solid layer. After the first layer is formed, a new thin layer of polymer powder can be spread over the powder bed and the process can be repeated to form additional layers until a complete 3-dimensional part is printed. Such 3-dimensional printing processes can achieve fast throughput with good accuracy.

In some examples of the presently disclosed technology, an x-ray contrast ink can be used together with a fusing ink to form 3-dimensional printed parts with x-ray contrast features. The x-ray contrast ink can be jetted on portions of the powder bed that may be desired to have x-ray contrast, and the fusing ink can be jetted on the same portions and/or other portions of the powder bed to form a printed part. The materials, systems, and methods described herein can be used to print parts having a variety of embedded security or serialization features that can be detected using x-ray microscopy or other radiographical imaging techniques. Non-limiting examples of such security or serialization features can include bar codes, quick response (OR) codes, trademarks, tradenames, words, instructions, shapes, the like, or combinations thereof.

In some examples of the present disclosure, a material set, such as for 3-dimensional printing, can include a thermoplastic polymer powder, an x-ray contrast ink, and a fusing ink. The x-ray contrast ink can include a jettable x-ray contrast agent and the fusing ink can include a fusing agent capable of absorbing electromagnetic radiation to produce heat. The fusing ink can be fused with the thermoplastic polymer powder to form the part, and the x-ray contrast ink can be fused therewith to form a security of serialization feature, for example.

The thermoplastic polymer powder can include powder particles with an average particle size from 20 μm to 100 μm. As used herein, "average" with respect to properties of particles refers to a number average unless otherwise specified. Accordingly, "average particle size" refers to a number average particle size. Additionally, "particle size" refers to the diameter of spherical particles, or to the longest dimension of non-spherical particles.

In certain examples, the polymer particles can include a variety of shapes, such as substantially spherical particles or irregularly-shaped particles. In some examples, the polymer powder can be capable of being formed into 3D printed parts with a resolution of 20 to 100 microns. As used herein, "resolution" refers to the size of the smallest feature that can be formed on a 3D printed part. The polymer powder can form layers from about 20 to about 100 microns thick, allowing the fused layers of the printed part to have roughly the same thickness. This can provide a resolution in the z-axis direction of about 20 to about 100 microns. The polymer powder can also have a sufficiently small particle size and sufficiently regular particle shape to provide about 20 to about 100 micron resolution along the x-axis and y-axis.

In some examples, the thermoplastic polymer powder can be colorless. For example, the polymer powder can have a white, translucent, or transparent appearance. When used with a colorless fusing ink, such polymer powders can provide a printed part that may be white, translucent, or transparent. In other examples, the polymer powder can be colored for producing colored parts. In still other examples, when the polymer powder is white, translucent, or transparent, color can be imparted to the part by the fusing ink or another colored ink.

The thermoplastic polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can be selected from the group consisting of nylon 6 powder, nylon 9 powder, nylon 11 powder, nylon 12 powder, nylon 66 powder, nylon 612 powder, polyethylene powder, thermoplastic polyurethane powder, polypropylene powder, polyester powder, polycarbonate powder, polyether ketone powder, polyacrylate powder, polystyrene powder, and mixtures thereof. In a specific example, the polymer powder can be nylon 12, which can have a melting point from about 175° C. to about 200° C. In another specific example, the polymer powder can be thermoplastic polyurethane.

The thermoplastic polymer particles can also in some cases be blended with a filler. The filler can include inorganic particles such as alumina, silica, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from 10:1 to 1:2 or from 5:1 to 1:1.

Material sets in accordance with the present technology can also include a fusing ink. In some examples, the fusing ink can be devoid or substantially devoid of the jettable x-ray contrast agent contained in the x-ray contrast ink. The fusing ink can contain a fusing agent that may be capable of absorbing electromagnetic radiation to produce heat. The fusing agent can be colored or colorless. In various examples, the fusing agent can be carbon black, near-infrared absorbing dyes, near-infrared absorbing pigments, tungsten bronzes, molybdenum bronzes, metal nanoparticles, or combinations thereof.

Examples of near-infrared absorbing dyes include aminium dyes, tetraaryldiamine dyes, cyanine dyes, pthalocyanine dyes, dithiolene dyes, and others. In further examples, the fusing agent can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that includes a backbone with alternating double and single bonds. In many cases, the fusing agent can have a peak absorption wavelength in the range of 800 nm to 1400 nm.

The amount of fusing agent in the fusing ink can vary depending on the type of fusing agent. In some examples, the concentration of fusing agent in the fusing ink can be from 0.1 wt % to 20 wt %. In one example, the concentration of fusing agent in the fusing ink can be from 0.1 wt % to 15 wt %. In another example, the concentration can be from 0.1 wt % to 8 wt %. In yet another example, the concentration can be from 0.5 wt % to 2 wt %. In a particular example, the concentration can be from 0.5 wt % to 1.2 wt %.

In some examples, the fusing ink can have a black or gray color due to the use of carbon black as the fusing agent. However, in other examples the fusing ink can be colorless or nearly colorless. The concentration of the fusing agent can be adjusted to provide a fusing ink in which the visible color of the fusing ink may not be substantially altered by the fusing agent. Although some of the above described fusing agents have low absorbance in the visible light range, the absorbance may be usually greater than zero. Therefore, the fusing agents can typically absorb some visible light, but their color in the visible spectrum can minimal enough that it does not substantially impact the ink's ability to take on another color when a colorant is added (unlike carbon black which dominates the ink's color with gray or black tones). The fusing agents in concentrated form can have a visible color, but the concentration of the fusing agents in the fusing ink can be adjusted so that the fusing agents may not be present in such high amounts that they alter the visible color of the fusing ink. For example, a fusing agent with a very low absorbance of visible light wavelengths can be included in greater concentrations compared to a fusing agent with a relatively higher absorbance of visible light. These concentrations can be adjusted based on a specific application with some experimentation.

In further examples, the concentration of the fusing agent can be high enough that the fusing agent impacts the color of the fusing ink, but low enough that when the ink is printed on the thermoplastic polymer powder, the fusing agent does not impact the color of the powder. The concentration of the fusing agent can be balanced with the amount of fusing ink that may be printed on the polymer powder so that the total amount of fusing agent printed onto the polymer powder may be low enough that the visible color of the polymer powder may not be impacted. In one example, the fusing agent can be included at a concentration in the fusing ink such that after the fusing ink is printed onto the polymer powder, the amount of fusing agent in the polymer powder may be from 0.0003 wt % to 5 wt % with respect to the weight of the polymer powder.

The fusing agent can have a temperature boosting capacity sufficient to increase the temperature of the polymer powder above the melting or softening point of the polymer powder. As used herein, "temperature boosting capacity" refers to the ability of a fusing agent to convert near-infrared light energy into thermal energy to increase the temperature of the printed polymer powder over and above the temperature of the unprinted portion of the polymer powder. Typically, the polymer powder particles can be fused together when the temperature increases to the melting or softening temperature of the polymer. As used herein, "melting point" refers to the temperature at which a polymer transitions from a crystalline phase to a pliable, amorphous phase. Some polymers do not have a melting point, but rather have a range of temperatures over which the polymers soften. This range can be segregated into a lower softening range, a middle softening range, and an upper softening range. In the lower and middle softening ranges, the particles can coalesce to form a part while the remaining polymer powder remains loose. If the upper softening range is used, the whole powder bed can become a cake. The "softening point," as used herein, refers to the temperature at which the polymer particles coalesce while the remaining powder remains separate and loose. When the fusing ink is printed on a portion of the polymer powder, the fusing agent can heat the printed portion to a temperature at or above the melting or softening point, while the unprinted portions of the polymer powder remain below the melting or softening point. This allows the formation of a solid 3D printed part, while the loose powder can be easily separated from the finished printed part.

Although melting point and softening point may often be described herein as the temperatures for coalescing the polymer powder, in some cases the polymer particles can coalesce together at temperatures slightly below the melting point or softening point. Therefore, as used herein "melting point" and "softening point" can include temperatures slightly lower, such as up to about 20° C. lower, than the actual melting point or softening point.

In one example, the fusing agent can include a temperature boosting capacity from about 10° C. to about 70° C. for a polymer with a melting or softening point from about 100° C. to about 350° C. If the powder bed is at a temperature within about 10° C. to about 70° C. of the melting or softening point, then such a fusing agent can boost the temperature of the printed powder up to the melting or softening point, while the unprinted powder remains at a lower temperature. In some examples, the powder bed can be preheated to a temperature from about 10° C. to about 70° C. lower than the melting or softening point of the polymer. The fusing ink can then be printed onto the powder and the powder bed can be irradiated with a near-infrared light to coalesce the printed portion of the powder.

The material set can also include an x-ray contrast ink. The x-ray contrast ink can include a jettable x-ray contrast agent. As used herein, "jettable" refers to an agent that can be formulated in a jettable ink composition and printed via an inkjet pen. More specifically, high viscosity, low water solubility, large particle size, and/or various other factors can adversely affect the jettability of an agent and render them unsuitable for inkjet printing.

The x-ray contrast ink can include one or more of a wide variety of jettable x-ray contrast agents. Such agents can be positive x-ray contrast agents or negative x-ray contrast agents. A "positive x-ray contrast agent" is a contrast agent that may be more x-ray attenuating than a comparative material under the same conditions. A "negative x-ray contrast agent" is a contrast agent that may be less x-ray attenuating than a comparative material under the same conditions. Thus, contrast agents can affect the amount of x-ray exposure on an x-ray film or detector relative to a comparative material such that areas including the contrast agent can be readily distinguishable from the comparative material in a radiograph.

The ability of an x-ray contrast agent to attenuate x-ray radiation can be affected by a variety of factors. Non-limiting examples of such factors can include density, thickness, atomic weight, the like, or combinations thereof. Thus, in some cases, high density materials can be used as positive contrast agents and low density materials can be used as negative contrast agents. Further, more densely printed areas can also be more x-ray attenuating than less densely printed areas. Higher printing density can be accomplished with a higher number of printing passes, increased drop volume, and the like. Similarly, a contrast agent or material having a greater thickness can typically be more x-ray attenuating than thinner areas. For example, x-ray jettable contrast agents can be printed across a number layers of a 3-dimensional printed part in overlapping regions to increase the x-ray attenuation of the region. Additionally, atoms with high atomic weights can typically be more x-ray attenuating than atoms having low atomic weights. Thus, in some examples, atoms with high atomic weights can be used with positive x-ray contrast agents and atoms with low atomic weights can be used with negative contrast agents. Further, the x-ray contrast agent can be selected based on the type of thermoplastic polymer particles and fusing agent used so as to provide x-ray contrast relative to the thermoplastic polymer and fusing agent composite. In some aspects, the x-ray contrast agent can be more x-ray attenuating than the thermoplastic polymer and fusing agent composite. In other examples, the x-ray contrast agent can be less x-ray attenuating than the thermoplastic polymer and fusing agent composite. In other examples, the x-ray contrast agent can reduce the attenuation of x-rays by facilitating the formation of air pockets within or a reduced density of the thermoplastic polymer and fusing agent composite. These principles can generally be applied in the selection of a suitable jettable x-ray contrast agent.

Thus, jettable x-ray contrast agents can include a wide variety of agents. Non-limiting examples can include transition metals, post-transition metals, metalloids, alloys thereof, compounds thereof, or combinations thereof. Jettable x-ray contrast agents can also include ceramics, salts, pigments, contrast dyes, or combinations thereof. In some examples, the jettable x-ray contrast agent can include aluminum, iron, chromium, titanium, palladium, gold, nickel, zinc, tin, copper, silver, lead, bismuth, indium, gallium, tungsten, barium, iodine, calcium, or a combination thereof. In some examples, the jettable x-ray contrast agent can be a particulate contrast agent having an average particle size from 10 nm to 200 nm, 20 nm to 150 nm, or from 30 nm to 100 nm. Further, the jettable contrast agent can be thermally stable at temperatures up to 150° C., 160° C., 170° C., 180° C., 190° C., or 200° C. By "thermally stable," it is meant that the jettable contrast agent does not degrade, decompose, or otherwise lose its anticipated or suitable x-ray attenuation properties at temperatures up to a specified temperature.

In some examples, the jettable x-ray contrast agent can be a cooling agent that may be applied to specific areas of the thermoplastic polymer particles to reduce the amount of fusing of the thermoplastic polymer particles in that area. This can reduce the density of fused thermoplastic polymer particles in a given area and/or introduce air pockets in the matrix of fused thermoplastic polymer particles. The reduced density or introduction of air pockets can reduce the x-ray attenuation of specific areas of a 3-dimensional printed part prepared with the material sets described herein. Non-limiting examples of cooling agents can include air, water, jettable organic solvents, or a combination thereof.

In some examples, the jettable x-ray contrast agent can be the fusing agent or a second fusing agent. Where the jettable x-ray contrast agent is the fusing agent, it can be applied in greater or lesser amounts in areas of a 3-dimensional printed part where x-ray contrast may be desired. However, in some examples, mere adjustment of the level of fusing agent will be insufficient to provide x-ray contrast without adversely affecting the quality of the 3-dimensional printed part.

Typically, when the x-ray contrast ink is printed onto a layer of the thermoplastic polymer powder, the x-ray contrast ink can penetrate into the spaces between powder particles. The layer can then be cured by exposing the layer to electromagnetic radiation. In some examples, the jettable x-ray contrast agent can absorb electromagnetic radiation to produce heat. In some examples, the x-ray contrast ink can include a second fusing agent. In some examples, the jettable x-ray contrast agent can include a transition metal. Thus, in some examples, the x-ray contrast ink can facilitate fusing of the powder particles by absorbing energy from the electromagnetic radiation and converting the energy to heat. In other examples, the x-ray contrast ink can be printed with the fusing ink and/or a second fusing ink to facilitate fusing of the thermoplastic polymer. In either scenario, the temperature of the powder may be raised above the melting or softening point of the thermoplastic polymer so as to facilitate the fusing process.

Where the jettable x-ray contrast agent is a transition metal, the transition metal in the x-ray contrast ink can also form a conductive transition metal matrix that becomes interlocked with the fused thermoplastic polymer particles. In some examples, the transition metal can be in the form of elemental transition metal particles. The elemental transition metal particles can include, for example, silver particles, copper particles, gold particles, platinum particles, palladium particles, chromium particles, nickel particles, zinc particles, or combinations thereof. The particles can also include alloys of more than one transition metal, such as Au—Ag, Ag—Cu, Ag—Ni, Au—Cu, Au—Ni, Au—Ag—Cu, or Au—Ag—Pd.

In certain examples, other non-transition metals can be included in addition to the transition metal. The non-transition metals can include lead, tin, bismuth, indium, gallium, and others. In some examples, soldering alloys can be included. The soldering alloys can include alloys of lead, tin, bismuth, indium, zinc, gallium, silver, copper, in various combinations. In certain examples, such soldering alloys can be printed in locations that may be used as soldering connections for printed electrical components. The soldering alloys can be formulated to include low melting temperatures useful for soldering, such as less than 230° C.

In certain examples, the elemental transition metal particles can be nanoparticles having an average particle size from 10 nm to 200 nm. In more specific examples, the elemental transition metal particles can have an average particle size from 30 nm to 70 nm.

As metal particles are reduced in size, the temperature at which the particles may be capable of being sintered can also be reduced. Therefore, using elemental transition metal nanoparticles in the x-ray contrast ink can allow the particles to sinter and form a matrix of sintered nanoparticles at relatively low temperatures. For example, the elemental transition metal particles in the x-ray contrast ink can be capable of being sintered at or below the temperature reached during curing in the 3-dimensional printing process. In a further example, the thermoplastic polymer powder bed can be heated to a preheat temperature during the printing process, and the elemental transition metal particles can be capable of being sintered at or below the preheat temperature. In still further examples, the elemental transition metal particles can be capable of being sintered at a temperature from 20° C. to 350° C. As used herein, the temperature at which the elemental transition metal particles may be capable of being sintered refers to the lowest temperature at which the particles will become sintered together, forming a matrix of sintered particles. It is understood that temperatures above this lowest temperature will also cause the particles to become sintered.

In additional examples of the x-ray contrast ink that includes a transition metal, the transition metal can be in the form of elemental transition metal particles that can be stabilized by a dispersing agent at surfaces of the particles. The dispersing agent can include ligands that passivate the surface of the particles. Suitable ligands can include a moiety that binds to the transition metal. Examples of such moieties can include sulfonic acid, phosphonic acid, carboxylic acid, dithiocarboxylic acid, phosphonate, sulfonate, thiol, carboxylate, dithiocarboxylate, amine, and others. In some cases, the dispersing agent can contain an alkyl group having from 3-20 carbon atoms, with one of the above moieties at an end of the alkyl chain. In certain examples, the dispersing agent can be an alkylamine, alkylthiol, or combinations thereof. In further examples, the dispersing agent can be a polymeric dispersing agent, such as polyvinylpyrrolidone (PVP), polyvinylalcohol (PVA), polymethylvinylether, poly(acrylic acid) (FAA), nonionic surfactants, polymeric chelating agents, and others. The dispersing agent can bind to the surfaces of the elemental transition metal particles through chemical and/or physical attachment. Chemical bonding can include a covalent bond, hydrogen bond, coordination complex bond, ionic bond, or combinations thereof. Physical attachment can include attachment through van der Waal's forces, dipole-dipole interactions, or a combination thereof.

In further examples, the x-ray contrast ink can include a transition metal in the form of a metal salt or metal oxide. Under certain conditions, a transition metal salt or metal oxide in the x-ray contrast ink can form elemental transition metal particles in situ after being printed onto the thermoplastic polymer powder bed. The elemental transition metal particles thus formed can then be sintered together to form a conductive matrix. In some examples, a reducing agent can be reacted with the metal salt or metal oxide to produce elemental metal particles. In one example, a reducing agent can be underprinted onto the powder bed before the conductive fusing ink. In another example, a reducing agent can be overprinted over the conductive fusing ink. In either case, the reducing agent can be reacted with the metal salt or metal oxide to form elemental metal particles before the thermoplastic polymer particle layer is cured. Suitable reducing agents can include, for example, glucose, fructose, maltose, maltodextrin, trisodium citrate, ascorbic acid, sodium borohydride, ethylene glycol, 1,5-pentanediol, 1,2-propylene glycol, and others.

The concentration of the jettable x-ray contrast agent in the x-ray contrast ink can vary. However, higher concentrations of jettable contrast agent can tend to provide better contrast relative to the polymer powder/fusing agent matrix. In some examples, the x-ray contrast ink can contain from about 5 wt % to about 50 wt % of the jettable x-ray contrast agent, with respect to the entire weight of the x-ray contrast ink. In further examples, the x-ray contrast ink can contain from about 10 wt % to about 30 wt % of the jettable x-ray contrast agent, with respect to the entire weight of the x-ray contrast ink.

In some examples of the material sets according to the present technology, an activating ink can be used with the x-ray contrast ink to provide additional functionality or other beneficial characteristic to the jettable x-ray contrast agent, or a feature printed therewith. The activating ink can include an activating agent. For example, where the jettable x-ray contrast agent includes a transition metal, the activating ink can include an activating agent such as a halogen salt (i.e. sodium chloride, potassium chloride, etc.). The chloride salt can react with dispersing agents at the surfaces of transition metal particles to remove the dispersing agents from the particles. This can increase the sintering between the metal particles and improve the conductivity of the matrix formed of the sintered particles.

In some examples, the activating ink can be dispensed onto the powder bed before the x-ray contrast ink. In other examples, the activating ink can be dispensed onto the powder bed after the x-ray contrast ink. In alternate examples, the polymer powder can be pretreated with an activating ink or activating agent. However the activating ink and/or activating agent is introduced onto the powder bed, the activating agent can come into contact with the jettable x-ray contrast agent to provide additional functionality or other beneficial characteristic.

As previously discussed, in some examples, the jettable x-ray contrast agent can absorb electromagnetic radiation to produce heat. In other examples, the jettable x-ray contrast agent can be printed with a fusing ink. In either case, the fusing agents associated with the x-ray contrast ink and the fusing ink can be balanced so that thermoplastic polymer powder that is printed with x-ray contrast ink will reach nearly the same temperature as the polymer powder printed with fusing ink alone, when exposed to light during curing. The type and amount of fusing agent in the fusing ink can be selected to match the temperature boosting capacity of the jettable x-ray contrast agent, or fusing agent printed therewith. The type and amount of jettable x-ray contrast agent in the x-ray contrast ink, or a fusing agent printed therewith, can also be adjusted to match the temperature boosting capacity of the fusing agent in the fusing ink. In certain examples, the x-ray contrast ink can raise the temperature of the thermoplastic polymer powder to temperatures within 30° C., within 20° C., or within 10° C. of the fusing ink during curing.

In further examples, the material set can also include colored inks for adding color to the thermoplastic polymer powder. The colored inks can include any suitable colorant, include dyes and/or pigments. This can allow for printing of full-color 3-dimensional parts. In one example, the material set can include cyan, magenta, yellow, and black inks in addition to the x-ray contrast ink, fusing ink, and activating ink if present.

Each of the x-ray contrast ink, activating ink, second fusing ink, and additional colored inks can be formulated for use in an ink jet printer. The x-ray contrast agent and fusing agents can be stable in an ink jet ink vehicle and the inks can provide good ink jetting performance. In some examples, the x-ray contrast agents and fusing agents can be water-soluble, water-dispersible, organic-soluble, or organic-dispersible. The x-ray contrast agents and fusing agents can also be compatible with the thermoplastic polymer powder so that jetting the inks onto the polymer powder provides adequate coverage and infiltration of the x-ray contrast agents and fusing agents into the powder.

The various inks described herein can also include a liquid vehicle. In some examples, the liquid vehicle formulation can include water, one or more solvents or co-solvents, biocides, viscosity modifiers, materials for pH adjustment, sequestering agents, preservatives, the like, or combinations thereof.

Figure 1:
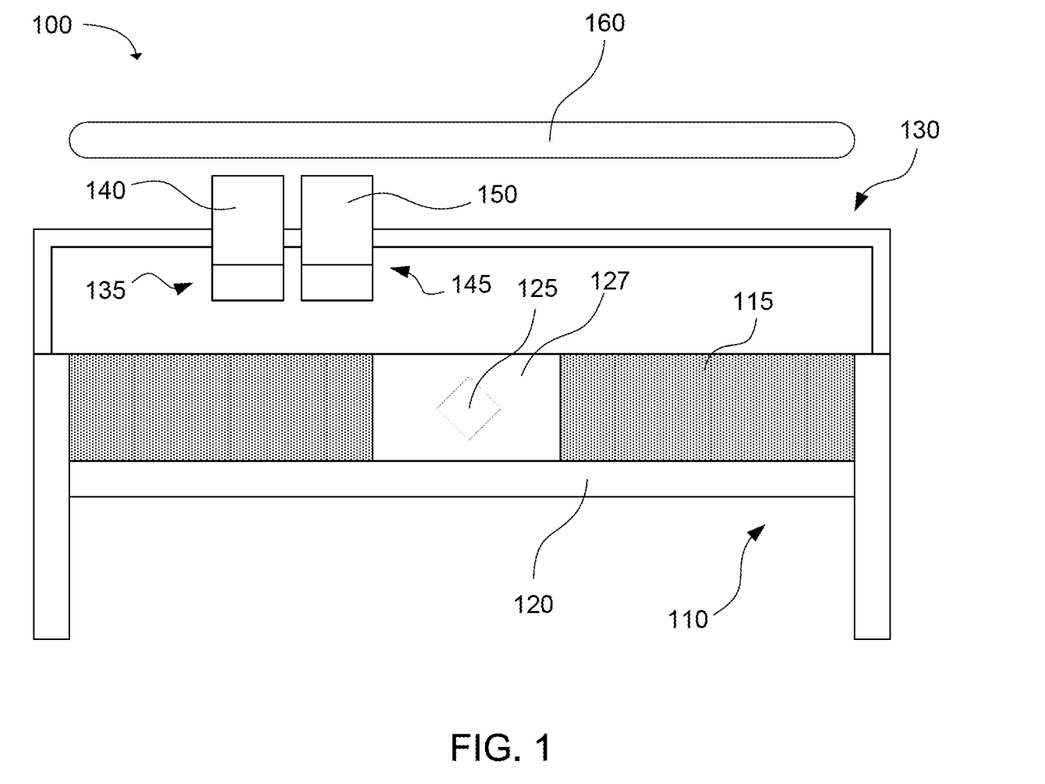
FIG. 1 is a schematic view of an example 3-dimensional printing system in accordance with the present disclosure.

In addition to the material sets described above, the present technology also encompasses 3-dimensional printing systems that include the material sets. An example of a 3-dimensional printing system 100 is shown in FIG. 1. The system includes a powder bed 110 including a thermoplastic polymer powder 115 with an average particle size from 20 µm to 100 µm. In the example shown, the powder bed may include a moveable floor 120 that allows the powder bed to be lowered after each layer of the 3-dimensional part is printed. The 3-dimensional part being printed can include an embedded x-ray contrast composite portion 125 and a body portion 127. The system also includes an inkjet printer 130 that includes a first inkjet pen 135 in communication with a reservoir of an x-ray contrast ink 140. The first inkjet pen can be configured to print the x-ray contrast ink onto the powder bed. A second inkjet pen 145 is in communication with a reservoir of a fusing ink 150. The second inkjet pen can be configured to print the fusing ink onto the powder bed. After the fusing inks have been printed onto the powder bed, a fusing lamp 160 can be used to expose the powder bed to electromagnetic radiation sufficient to fuse the powder that has been printed with the fusing inks. Alternatively, the fusing lamp or lamps can ride along with the inkjet pens and fuse the ink with the powder as the inkjet pens are moved. Heating lamps (not shown) can be used to heat the powder in some examples where the powder is kept warm or hot.

The material set used in the 3-dimensional printing system can include any of the components and ingredients described above. In a particular example, thermoplastic polymer powder can include a nylon, a thermoplastic elastomer, a urethane, a polycarbonate, or a polystyrene. In another example, the jettable x-ray contrast agent can be thermally stable at temperatures up to 170° C. In another example, the fusing agent in the fusing ink can include carbon black, a near-infrared absorbing dye, a near-infrared absorbing pigment, a tungsten bronze, a molybdenum bronze, metal nanoparticles, a conjugated polymer, or combinations thereof.

In some examples, the 3-dimensional printing system can also include a third inkjet pen in communication with a reservoir of activating ink to print the activating ink onto the powder bed. In further examples, the 3-dimensional printing system can include additional inkjet pens for colored inks, additional fusing inks, or other suitable inks.

To achieve good selectivity between the fused and unfused portions of the powder bed, the fusing inks can absorb enough energy to boost the temperature of the thermoplastic polymer powder above the melting or softening point of the polymer, while unprinted portions of the powder bed remain below the melting or softening point. In some examples, the 3-dimensional printing system can include preheaters for preheating the thermoplastic polymer powder to a temperature near the melting or softening point. In one example, the system can include a print bed heater to heat the print bed during printing. The preheat temperature used can depend on the type of thermoplastic polymer used. In some examples, the print bed heater can heat the print bed to a temperature from 130° C. to 160° C. The system can also include a supply bed, where polymer particles may be stored before being spread in a layer onto the print bed. The supply bed can have a supply bed heater. In some examples, the supply bed heater can heat the supply bed to a temperature from 90° C. to 140° C.

Suitable fusing lamps for use in the 3-dimensional printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to coalesce each printed layer. The fusing lamp can be configured to irradiate the entire powder bed with a substantially uniform amount of energy. This can selectively coalesce the printed portions with fusing inks leaving the unprinted portions of the polymer powder below the melting or softening point.

In one example, the fusing lamp can be matched with the fusing agents in the fusing inks so that the fusing lamp emits wavelengths of light that match the peak absorption wavelengths of the fusing agents. A fusing agent with a narrow peak at a particular near-infrared wavelength can be used with a fusing lamp that emits a narrow range of wavelengths at approximately the peak wavelength of the fusing agent. Similarly, a fusing agent that absorbs a broad range of near-infrared wavelengths can be used with a fusing lamp that emits a broad range of wavelengths. Matching the fusing agent and the fusing lamp in this way can increase the efficiency of coalescing the polymer particles with the fusing agent printed thereon, while the unprinted polymer particles do not absorb as much light and remain at a lower temperature.

Depending on the amount of fusing agent present in the polymer powder, the absorbance of the fusing agent, the preheat temperature, and the melting or softening point of the polymer, an appropriate amount of irradiation can be supplied from the fusing lamp. In some examples, the fusing lamp can irradiate each layer with an amount of irradiation to cure the thermoplastic polymer particles within about 0.5 to about 10 seconds after initial exposure.

The present technology also extends to 3-dimensional printed parts. In some examples, the 3-dimensional printed parts can be formed from the materials sets described herein. In other examples, the 3-dimensional parts can be formed from different material sets that may be more suitable for a different type of 3-dimensional printing process. Various 3-dimensional printed processes can be employed in preparing the 3-dimensional printed parts described herein, such as multi-jet fusion (MJF), selective laser sintering (SLS), stereolithography (SLA), and even fusion deposition modeling (FDM) using a dual extruder and a spool of metal-bearing plastic filament or equivalent, for example. However, for the sake of brevity, the 3-dimensional printed parts will be described with respect to the material sets that have been described herein. Nonetheless, this is not intended to be limiting and any suitable 3-dimensional printing process can be used and is considered within the scope of the current description.

Thus, in one example, a 3-dimensional printed part can include an embedded x-ray contrast composite portion including a matrix of jettable x-ray contrast agent. Additionally, the 3-dimensional printed part can include a body portion that is continuous with the embedded x-ray contrast composite portion. In some examples, the body portion can be substantially free of the jettable x-ray contrast agent in the embedded x-ray contrast portion. In some examples, the embedded contrast composite portion, the body portion, or both can further include a matrix of fused thermoplastic polymer particles. Where the embedded x-ray contrast composite portion includes a matrix of fused thermoplastic polymer particles, the matrix of x-ray contrast agent can be interlocked with or dispersed throughout the matrix of fused thermoplastic polymer particles.

Figure 2:
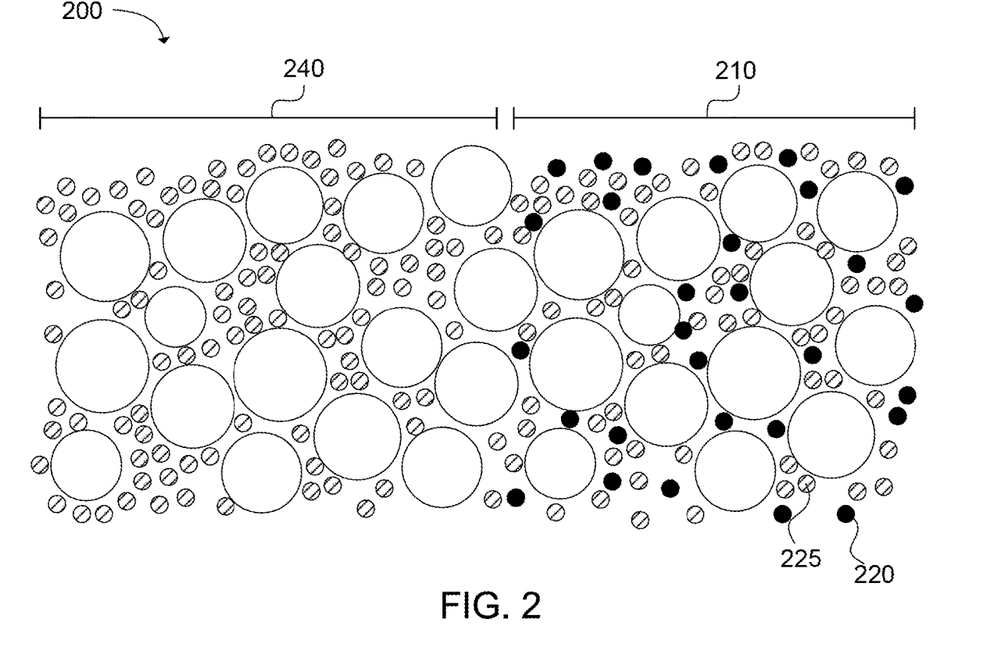
FIG. 2 is a close-up side cross-sectional view of an example layer of thermoplastic polymer powder with an x-ray contrast ink printed on a portion of the layer in accordance with the present disclosure.
Figure 3:
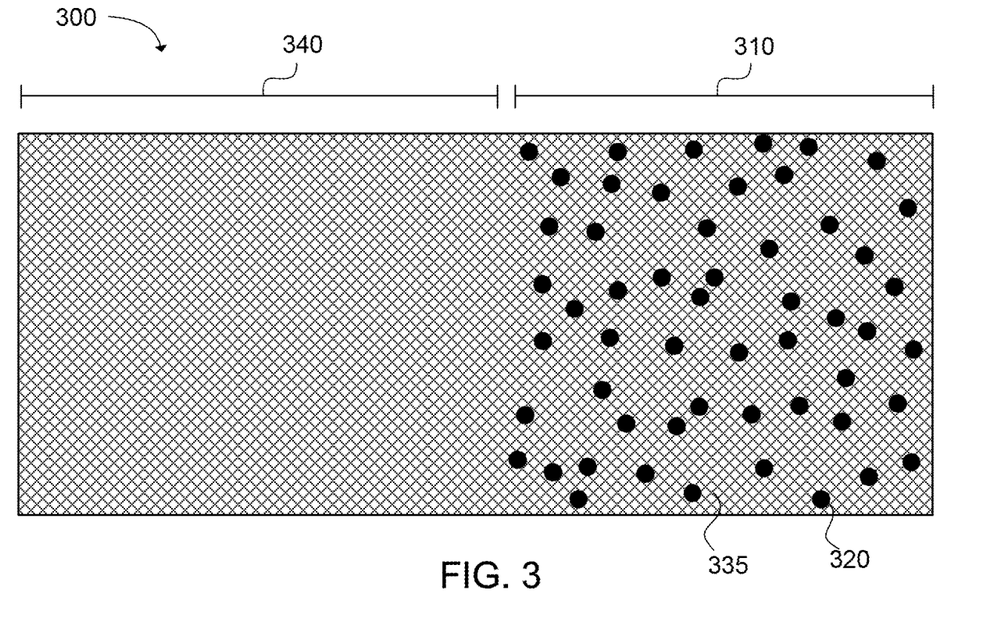
FIG. 3 is a close-up side cross-sectional view of the example layer of FIG. 2 after the layer has been cured in accordance with the present disclosure.

One example of the formation of an x-ray contrast portion is illustrated in FIGS. 2-3. FIGS. 2-3 provide close-up cross sectional views of a layer of the thermoplastic polymer powder bed that has been printed with an x-ray contrast ink and a fusing ink. FIG. 2 shows the powder layer 200 after being printed but before being cured, and FIG. 3 shows the coalesced powder layer 300 after being cured. In FIG. 2, a first portion 210 of the powder layer 200 has been printed with an x-ray contrast ink containing jettable x-ray contrast agent particles 220 and with fusing ink containing fusing agent 225. The x-ray contrast agent particles penetrate into the spaces between the powder particles 230. A second portion 240 of the powder layer has been printed with a fusing ink including a fusing agent, but without x-ray contrast ink. Thus, as shown, only a portion of the printed part includes the x-ray contrast agent. It should be noted that these figures are not necessarily drawn to scale, and the relative sizes of powder particles and x-ray contrast agent particles can differ from those shown. However, the x-ray contrast agent need not be in the form of particles.

As shown in FIG. 3, when the powder layer 300 is cured by exposure to electromagnetic radiation, the jettable x-ray contrast agent particles 320 as shown dispersed through a portion of a matrix 335 formed by fusing agent in the ink and the powder particles in the first portion 310. In some examples, the jettable x-ray contrast agent can be a fusible material per se, or it can be entrapped in the matrix, as shown. For example, the matrix of jettable x-ray contrast agent particles and the matrix of fused thermoplastic polymer particles can be interlocked, forming the embedded x-ray contrast composite. It should be noted that FIGS. 2 and 3 show only a 2-dimensional cross-section of a portion of a conductive composite.

In some examples, the embedded x-ray contrast composite portion can provide a negative x-ray contrast as compared to the body portion. In other examples, the embedded x-ray contrast portion can provide a positive contrast as compared to the body portion. Sufficient contrast between the embedded x-ray contrast composite portion and the body portion can be achieved by dispensing a sufficient amount of jettable x-ray contrast agent onto the powder bed. In some examples, a sufficient mass of the jettable x-ray contrast agent per volume of the embedded x-ray contrast composite can be used to achieve sufficient contrast. For example, the mass of jettable x-ray contrast agent per volume of embedded x-ray contrast composite can be greater than 0.01 $mg/cm^3$, greater than $mg/cm^3$, greater than 1 $mg/cm^3$, greater than 10 $mg/cm^3$, greater than 50 $mg/cm^3$, or greater than 100 $mg/cm^3$. In a particular example, the mass of jettable x-ray contrast agent per volume of the embedded x-ray contrast composite can be greater than 140 $mg/cm^3$. In further examples, the mass of jettable x-ray contrast agent per volume of the embedded x-ray contrast composite can be from 0.1 $mg/cm^3$ to 1000 $mg/cm^3$, from 1.0 $mg/cm^3$ to 1000 $mg/cm^3$, from 10 $mg/cm^3$ to 500 $mg/cm^3$, or from 100 $mg/cm^3$ to 500 $mg/cm^3$.

The body portion can be formed of multiple layers of fused thermoplastic polymer particles stacked in a z-axis direction. The z-axis refers to the axis orthogonal to the x-y plane. For example, in 3-dimensional printing systems having a powder bed floor that lowers after each layer is printed, the z-axis is the direction in which the floor is lowered. In some examples, the embedded x-ray contrast composite can be oriented at least partially in the z-axis direction. For example, the embedded x-ray contrast composite can be formed in a diagonal direction that includes components of the z-axis direction and the x- and/or y-axis directions.

In some examples, the amount of jettable x-ray contrast agent dispensed onto the powder bed can be adjusted by printing the x-ray contrast ink in multiple passes. In one example, a single pass of an inkjet printhead can be sufficient to dispense enough jettable x-ray contrast agent to achieve contrast of the embedded x-ray contrast composite portion relative to the body portion. However, in some cases, a single pass is not sufficient to achieve good contrast in the z-axis direction. Additional passes can be applied to increase the amount of jettable x-ray contrast agent in the embedded x-ray contrast composite. In one example, three or more passes can be used to achieve contrast of the embedded x-ray contrast composite portion relative to the body portion in the z-axis direction. In further examples, the amount of jettable x-ray contrast agent dispensed can be adjusted by adjusting the drop weight of the inkjet printhead either through resistor design or by changing firing parameters. Thus, with a greater drop weight, a greater amount of the x-ray contrast ink can be printed with each drop fired. However, in some cases jetting too large an amount of ink in a single pass can lead to lower print quality because of ink spreading. Therefore, in some examples multiple passes can be used to print more of the x-ray contrast ink with better print quality.

In a particular example, a 3-dimensional printed part can be formed as follows. An inkjet printer can be used to print a first pass including printing an x-ray contrast ink onto a first portion of the powder bed and printing a fusing ink onto a second portion of the powder bed. A curing pass can then be performed by passing a fusing lamp over the powder bed to fuse the polymer particles and fuse the jettable x-ray contrast agent, or entrap the jettable x-ray contrast agent within the fused polymer particles. Then, one or more additional passes can be performed of printing the x-ray contrast ink onto the first portion of the powder bed to increase the amount of jettable x-ray contrast agent. Each pass of printing the x-ray contrast ink can be followed by a curing pass with the fusing lamp. The number of passes used can depend on the desired contrast, the contone level of the printing passes (referring to the density of ink per area deposited on each pass), the type of jettable x-ray contrast agent in the x-ray contrast ink, concentration of jettable x-ray contrast agent in the x-ray contrast ink, thickness of the layer of polymer powder being printed, and so on.

Figure 4:
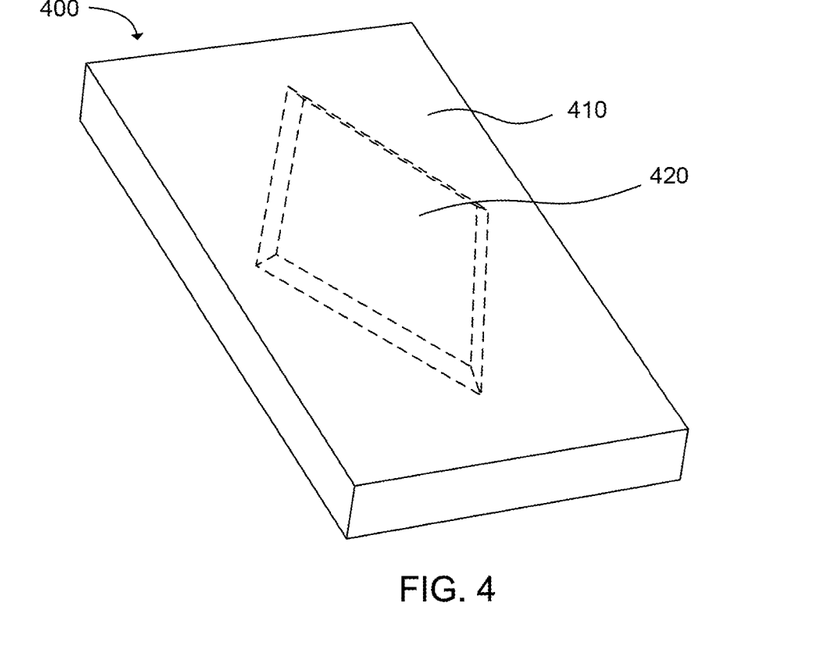
FIG. 4 is a diagonal view of an example 3-dimensional printed part having an embedded x-ray contrast composite portion, in accordance with the present disclosure.

FIG. 4 shows an example of a 3-dimensional printed part 400 that includes a body portion 410 and an embedded x-ray contrast composite portion 420. The embedded x-ray contrast composite portion has been printed within the body portion such that it is not visible by the naked eye. It is noted that the illustrated 3-dimensional printed part can be printed in a number of orientations, such as with the diamond shaped embedded x-ray composite portion facing up, facing sideways, etc. Regardless of the orientation in which the part was printed, the x-ray contrast composite portion is oriented at least partially in the z-axis direction across multiple layers.

Figure 5A:
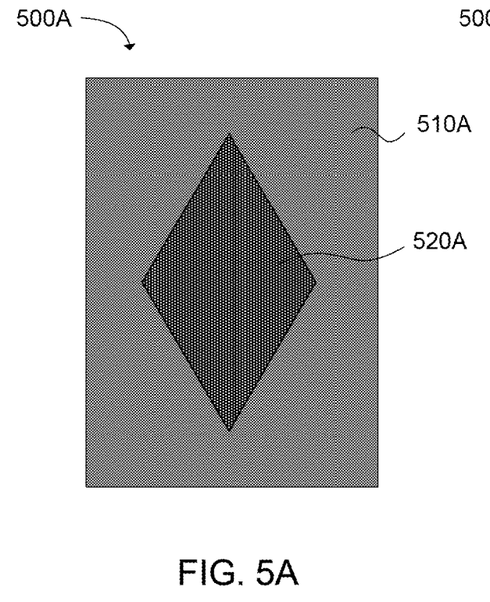
FIG. 5A is a representation of a radiograph of the example 3-dimensional printed part of FIG. 4 in accordance with the present disclosure.

As has been noted previously, the x-ray contrast composite portion 420 can be formed using a negative or positive x-ray contrast agent. In some examples, the x-ray contrast composite portion can be formed using a negative x-ray contrast agent. A radiograph 500A of 3-dimensional printed part 400 is illustrated in FIG. 5A. In this particular example, the x-ray contrast composite portion was formed using a negative x-ray contrast agent. Accordingly, the body portion exposure area 510A can be more x-ray attenuating than the x-ray contrast composite exposure area 520A. This can result in a more exposed and darker x-ray contrast composite exposure area than the body portion exposure area.

In one specific example, this can be accomplished by introducing air pockets into the x-ray contrast composite portion, or otherwise reducing the density of the x-ray contrast composite portion relative to the body portion. Where the 3-dimensional printed part is prepared using a matrix of fused thermoplastic polymer particles, a cooling agent can be employed to reduce a degree of fusing of the thermoplastic polymer particles in the x-ray contrast composite portion. Cooling agents can include air, water, jettable organic solvents, or a combination thereof. In other examples, the jettable x-ray contrast agent can be less x-ray attenuating than the fused thermoplastic polymer particles, and can be interdispersed therein to provide perturbations in the fused matrix to decrease x-ray attenuation in the x-ray contrast composite portion. Equivalent techniques or methods can be used for other 3-dimensional printing processes that do not employ a matrix of fused thermoplastic polymer particles.

Figure 5B:
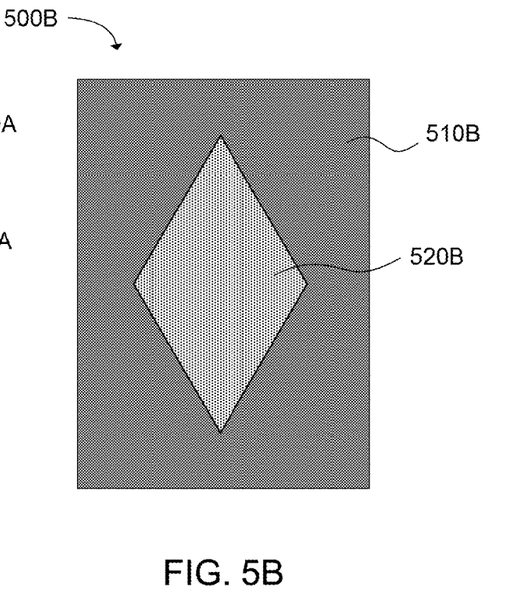
FIG. 5B is a representation of a radiograph of the example 3-dimensional printed part of FIG. 4 in accordance with the present disclosure.

In contrast, a radiograph 500B of 3-dimensional printed part 400 (illustrated in FIG. 4) is illustrated in FIG. 5B where the printed part includes an embedded x-ray contrast composite portion formed with a positive x-ray contrast agent. Accordingly, the body portion exposure area 510B can be less x-ray attenuating than the x-ray contrast composite exposure area 520B. This can result in a less exposed and lighter x-ray contrast composite exposure area than the body portion exposure area.

Thus, the x-ray contrast composite portion can be formed using positive x-ray contrast agents, negative contrast agents, or a combination thereof, in any suitable orientation or pattern. For example, while FIGS. 5A and 5B illustrate the x-ray contrast composite exposure areas 520A, 520B as having a relatively uniform exposure level, this is not required. In many examples, the x-ray contrast composite portion or portions can be printed with different combinations and/or patterns of x-ray contrast agents to form radiographically detectable patterns, instructions, symbols, serialization codes, the like, or combinations thereof that do not uniformly attenuate x-ray radiation.

It is noted that, as used in this specification and the appended claims, the singular forms "a," "an," and "the" include plural referents unless the context clearly dictates otherwise.

As used herein, "liquid vehicle" or "ink vehicle" refers to a liquid fluid in which additives may be placed to form inkjettable fluids, such as inks. A wide variety of liquid vehicles may be used in accordance with the technology of the present disclosure. Such liquid or ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants and fusing agents, the liquid vehicle can carry solid additives such as polymers, latexes, UV curable materials, plasticizers, salts, etc.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific aspect, however, the pigment is a pigment colorant.

As used herein, "soluble," refers to a solubility percentage of more than 5 wt %.

As used herein, "ink jetting" or "jetting" refers to compositions that may be ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following illustrates several examples of the present disclosure. However, it is to be understood that the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1

A 3-dimensional printing system was used to print a 3-dimensional printed part having a serpentine-shaped x-ray contrast composite portion embedded within the body portion. An x-ray contrast ink, activating ink, and fusing ink were printed from three separate ink jet pens. The x-ray contrast ink was a silver ink (Mitsubishi NBSIJ-MU01) containing silver nanoparticles. The silver nanoparticles had an average particle size of approximately 20 nm. The activating ink was a solution of 3 wt % sodium chloride in water. The second fusing ink included carbon black as the fusing agent and an aqueous ink vehicle.

The inks were jetted onto a bed of nylon (PA12) particles (Vestosint®×1556). The nylon particles had an average particle size of approximately 50 μm. The layer thickness was approximately 100 μm. Each layer was printed with the activating ink followed by the silver ink in the portions that made up the serpentine-shaped x-ray contrast area, and the carbon black fusing ink in the body portions. The inks were printed at contone levels of 255 for the silver ink, 255 for the activating ink, and 15 for the carbon black ink. 3 passes of the inks were performed for each layer. After each pass with the inks, a curing pass was performed.

The printer powder supply and powder bed were filled with the nylon particles. The supply temperature was set at 110° C. and the print bed temperature was set at 130° C. A heater under the print bed was set at 150° C. The print speed was set at 10 inches per second (ips) and the cure speed was set at 7 ips. Curing was performed using two 300 W bulbs placed approximately 1 cm away from the surface of the powder bed.

The 3-dimensional printed part included embedded features that were not visible to the naked eye. X-ray microscopy was employed to determine whether the serpentine-shaped x-ray contrast composite portion was distinguishable from the body portion using radiographical methods. More specifically, x-ray images were obtained of the 3-dimensional part at a 20 μm resolution, 150 kV power, and 140 μA (21 W). The serpentine-shaped x-ray contrast composite portion was clearly distinguishable as a less exposed region of the x-ray micrograph obtained from the 3-dimensional printed part.

What is claimed is:

1. A material set, comprising:
   a thermoplastic polymer powder having an average particle size from 20 μm to 100 μm;
   an x-ray contrast ink comprising a jettable x-ray contrast agent; and
   a fusing ink comprising a fusing agent capable of absorbing electromagnetic radiation to produce heat;
   wherein the thermoplastic polymer powder comprises a nylon, a thermoplastic elastomer, a urethane, a polycarbonate, or a polystyrene.

2. The material set of claim 1, wherein the jettable x-ray contrast agent comprises aluminum, iron, chromium, titanium, palladium, gold, nickel, zinc, tin, copper, silver, lead, bismuth, indium, gallium, tungsten, barium, iodine, calcium, or a combination thereof.

3. The material set of claim 1, wherein the jettable x-ray contrast agent is thermally stable at temperatures up to 170° C.

4. The material set of claim 1, wherein the jettable x-ray contrast agent is a particulate contrast agent having an average particle size from 10 nm to 200 nm.

5. A 3-dimensional printing system including the material set of claim 1, comprising:
   a powder bed comprising the thermoplastic polymer powder;
   an inkjet printer comprising:
      a first inkjet pen in communication with a reservoir of the x-ray contrast ink to print the x-ray contrast ink onto the powder bed, and
      a second inkjet pen in communication with a reservoir of the fusing ink to print the fusing ink onto the powder bed; and
   a fusing lamp to expose the powder bed to electromagnetic radiation sufficient to fuse thermoplastic polymer powder that has been printed with the x-ray contrast ink, the fusing ink, or both.

6. The system of claim 5, wherein the jettable x-ray contrast agent is thermally stable at temperatures up to 170° C.

7. The system of claim 5, wherein the fusing agent comprises carbon black, a near-infrared absorbing dye, a near-infrared absorbing pigment, a tungsten bronze, a molybdenum bronze, metal nanoparticles, a conjugated polymer, or combinations thereof.

8. The material set of claim 1, wherein the x-ray contrast ink and the fusing ink are separate agents in separate printheads.

9. The material set of claim 1, wherein the fusing agent comprises carbon black, a near-infrared absorbing dye, a near-infrared absorbing pigment, a tungsten bronze, a molybdenum bronze, metal nanoparticles, a conjugated polymer, or combinations thereof.

10. A material set, comprising:
- a thermoplastic polymer powder having an average particle size from 20 μm to 100 μm;
- an x-ray contrast ink comprising a jettable x-ray contrast agent; and
- a fusing ink comprising a fusing agent capable of absorbing electromagnetic radiation to produce heat;
- wherein the fusing agent comprises carbon black, a near-infrared absorbing dye, a near-infrared absorbing pigment, a tungsten bronze, a molybdenum bronze, metal nanoparticles, a conjugated polymer, or combinations thereof.

11. The material set of claim 10, wherein the thermoplastic polymer powder comprises a nylon, a thermoplastic elastomer, a urethane, a polycarbonate, or a polystyrene.

* * * * *